United States Patent [19]
Gersuk et al.

[11] Patent Number: 5,376,980
[45] Date of Patent: Dec. 27, 1994

[54] SEGMENTED TORUS SCREEN

[75] Inventors: Stephen H. Gersuk, Valrico; Gregory P. Ripp, Brandon, both of Fla.

[73] Assignee: Contraves USA-SSI, Tampa, Fla.

[21] Appl. No.: 995,987

[22] Filed: Dec. 23, 1992

Related U.S. Application Data

[63] Continuation-in-part of Ser. No. 827,154, Jan. 28, 1992, Pat. No. 5,175,575.

[51] Int. Cl.⁵ .............................................. G03B 21/60
[52] U.S. Cl. ....................................... 353/94; 359/451
[58] Field of Search ...................... 353/11, 30, 94, 98; 359/451, 459, 449, 443; 352/69, 70, 71

[56] References Cited

U.S. PATENT DOCUMENTS

| | | | |
|---|---|---|---|
| 2,476,521 | 7/1949 | Waller | 359/451 |
| 3,348,897 | 10/1967 | Hourdiaux | 359/451 |
| 4,354,737 | 10/1982 | Dotsko et al. | 359/451 |
| 5,112,121 | 5/1992 | Chang et al. | 353/94 |

*Primary Examiner*—William A. Cuchlinski, Jr.
*Assistant Examiner*—William C. Dowling
*Attorney, Agent, or Firm*—Ansel M. Schwartz

[57] ABSTRACT

The present invention is a projection system. The projection system comprises a plurality of screen segments, each defining a surface in the shape of a toroidal segment having geometric proportions approximating the shape of a predetermined ellipsoidal segment having a first focal point and a second focal point. The screen segments are arranged such that an edge of the surface of one of the screen segments is essentially adjacent along its entire length to an edge of the surface of another screen segment. The projection system also comprises a plurality of projectors equal to the number of screen segments wherein each of said projectors projects an image upon one of the screen segments from the second focal point of the ellipsoidal segment approximated by the screen segment. Preferably, the screen segments are arranged such that the first focal point of each ellipsoidal segment approximated by the surface of the screen segments essentially coincide with each other.

22 Claims, 9 Drawing Sheets

SEGMENTED TORUS SCREEN

This is a continuation-in-part application of U.S. patent application Ser. No. 07/827,154 filed Jan. 28, 1992, now U.S. Pat. No. 5,175,575, issued Dec. 29, 1992.

FIELD OF THE INVENTION

The present invention is related in general to projection screens. More particularly, the present invention is related to a projection screen having a plurality of toroidal screen segments each of which approximates an ellipsoidal segment.

BACKGROUND OF THE INVENTION

Projection screens are commonly fabricated by those skilled in the art either from fiberglass laid up over a mold, or from panels of aluminum sheet supported by a structure of ribs and trusses. In the case of a fiberglass ellipsoidal screen, a mold must be created for the entire segment surface, with constantly varying surface curvatures. This type of mold is expensive to create and inspect.

In the case of an aluminum screen, each panel is limited in size to a maximum of 4 feet by 12 feet, this being the standard size for aluminum sheet. For common projection surfaces like spheres and tori, all panels may be press-formed from the same die. The panels are then cut along lines of latitude and longitude of the sphere or torus and placed on a framework that supports the panels in close juxtaposition, such that the interior surface of a portion of a sphere or torus is created. The use of a single die is an important feature of the process, as the non-recurring cost of fabrication of such a die, commonly made by those skilled in the art from epoxy or laminated maple, may be the same as the recurring cost of an entire screen.

For the manufacture of an ellipsoidal segment described by the prior invention, however, fabrication of each segment from a plurality of panels, such that the size of any panel does not exceed the aforementioned limited size, requires the use of not one but four dies: one for the left panel, one for the left center panel, one for the right center panel, and one for the right panel. While the left-right inner and outer pairs are mirror images of one another, this accrues to no advantage in reducing the unit cost of the dies. Therefore, the tooling cost of the ellipsoidal segmented screen is several times greater than that of the simpler spherical or torus screen, and this cost is a significant portion of the total cost of one or several screens.

It would be desirable, therefore, to approximate the ellipsoidal shapes of screen segments of a segmented ellipsoidal screen using the simpler surface of a torus, presuming that the torus could be specified so as to preserve the worthy attributes of the high-gain segmented ellipsoidal screen, to wit, the absence of discontinuities in brightness across channel boundaries when viewed from a point away from the center eyepoint and high overall brightness.

SUMMARY OF THE INVENTION

The present invention is a projection system. The projection system comprises a plurality of screen segments, each defining a surface in the shape of a toroidal segment having geometric proportions approximating the shape of a predetermined ellipsoidal segment having a first focal point and a second focal point. The screen segments are arranged such that an edge of the surface of one of the screen segments is essentially adjacent along its entire length to an edge of the surface of another screen segment defining a boundary. The projection system also comprises a plurality of projectors equal to the number of screen segments wherein each of said projectors projects an image upon one of the screen segments from the second focal point of the ellipsoidal segment approximated by the screen segment. Preferably, the screen segments are arranged such that the first focal point of each ellipsoidal segment approximated by the surface of the screen segments essentially coincide with each other. Preferably, each screen segment is comprised of a curved panel mounted on a support structure of headers and ribs and the headers and ribs of all of the screen segments have equal radial dimensions, respectively.

The present invention is also a method of fabricating a projection screen. The method comprises the step of defining a plurality of ellipsoidal segments each having a first focal point and a second focal point. Next, there is the step of forming a plurality of screen segment having a surface in the shape of a toroidal segment having geometric proportions approximating the shape of one of the defined ellipsoidal segments. Then, there is the step of arranging the screen segments in an adjacent relationship such that an edge of the surface of one of the screen segments is essentially adjacent along its entire length to an edge of the surface of another screen segment.

Preferably, the arranging step includes the step of arranging the screen segments such that the first focal points of each ellipsoidal segment approximated by the screen segments essentially coincide with each other. Preferably, after the arranging step, there is the step of projecting images onto the surface of each screen segment from the second focal point of the ellipsoidal segment which each screen segment is approximating. Preferably, before the forming step, there is the step of defining a toroidal segment which geometrically approximates each ellipsoidal segment.

The present invention is also a projection system. The projection system comprises means for projecting an image such as a projector and a screen upon which the image is projected. The screen is positioned adjacent to the projecting means to receive the image. The screen has a shape such that gain with respect to the image at a center eyepoint is equal to gain with respect to the image at the screen along its surface. Preferably, the screen is comprised of a plurality of screen segments disposed about the center eyepoint such that boundaries are formed between the screen segments and for points off of the center eyepoint there are no discontinuities in brightness of the image across boundaries.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
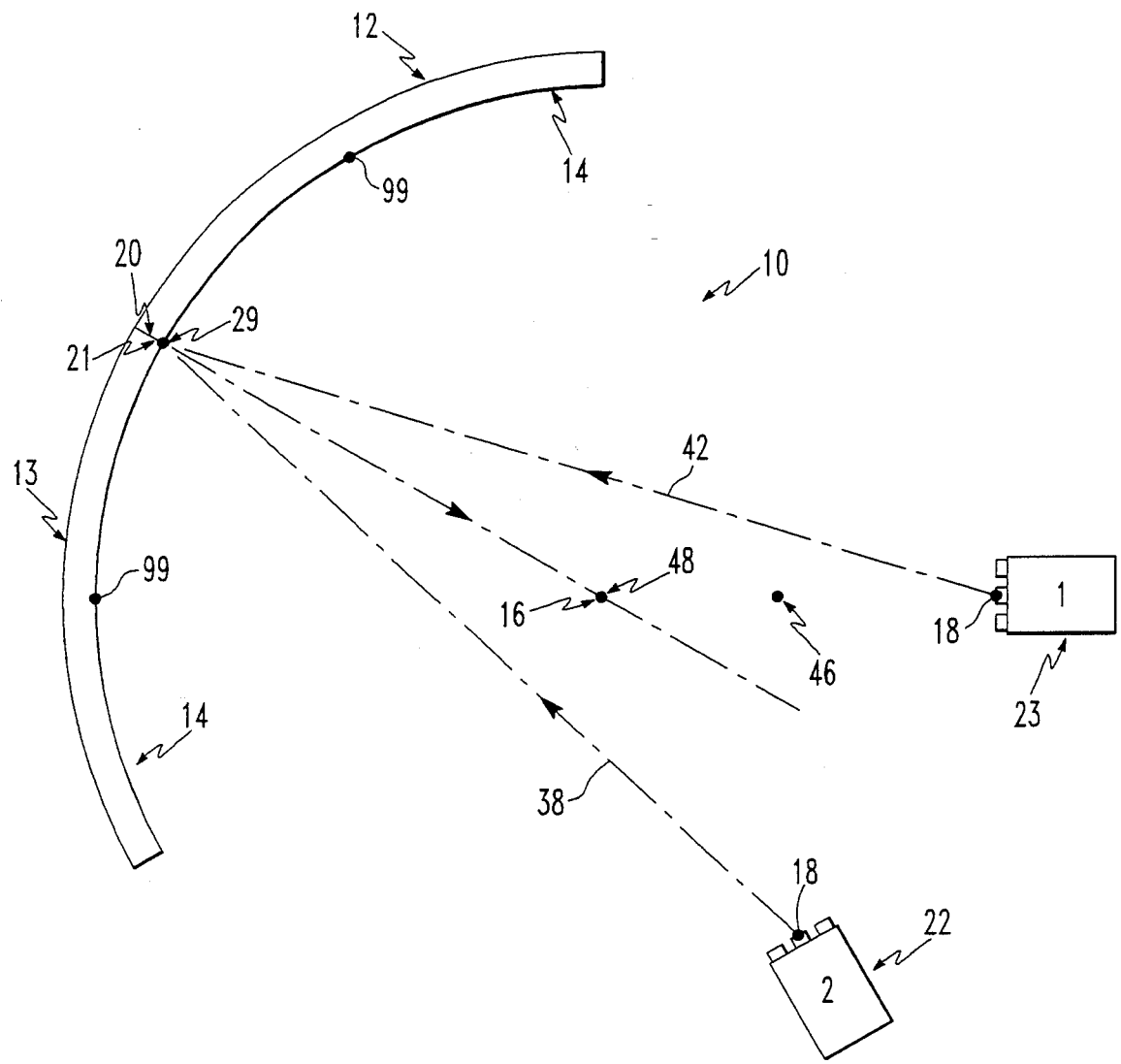
FIG. 1 is a graphical representation showing a plan view of the segmented ellipsoidal projecting system.

Referring now to the drawings wherein like reference numerals refer to similar or identical parts throughout the several views, and more specifically to FIG. 1 thereof, there is shown a projection system 10. The projection system 10 comprises a plurality of screen segments. There are two screen segments 12, 13 shown in FIG. 1 for simplicity of description. Each screen segment 12, 13 defines a surface 14 having the shape of an ellipsoidal segment (part of the surface area of an ellipsoid) such that each surface 14 has a first focal point 16, a second focal point 18, and a point on the screen surface 99, point 99 being selected to achieve the desired viewing distance from the focal point 16 to the screen. The continuous ellipsoidal surface thus defined is the locus of all points the sum of whose distances to the two focal point points is a constant, to wit, the same as point 99. The surface of each segment is only a portion of the continuous ellipsoidal surface thus defined, being bounded by vertical planes radiating from focal point 16 at regular angular spacings. One such plane divides segments 12 and 13 along their boundary 29. The segment is further bounded top and bottom to achieve the desired vertical field of view although this boundary is not apparent in the figures. The screen segments 12, 13 are arranged such that an edge 20 of the surface 14 of screen segment 12 is essentially adjacent along its entire length to an edge 21 of the surface 14 of screen segment 13. The edges 20, 21 meet to form a boundary 29 between the screen segments 12, 13.

The projection system 10 also includes a plurality of projectors, one for each screen segment. Projector 22 projects an image onto the surface 14 of screen segment 12. Projector 23 projects an image onto the surface 14 of the screen segment 13. It is known in the art to shape the raster of the projectors so as to achieve left and right edges of each projected image that abut one to the other essentially without gaps or overlap, or alternatively to perform video processing in addition to raster shaping such that the images overlap smoothly with blended edges so as to create an essentially undiscernible seam between adjacent images. The projectors 22, 23 project an image upon their respective screen segments 12, 13 from the second focal point 18 of that screen segment 12, 13. Preferably, the first focal point 16 of the screen segments 12, 13 coincide with each other at point 48 or are within close proximity to each other.

Figure 2:
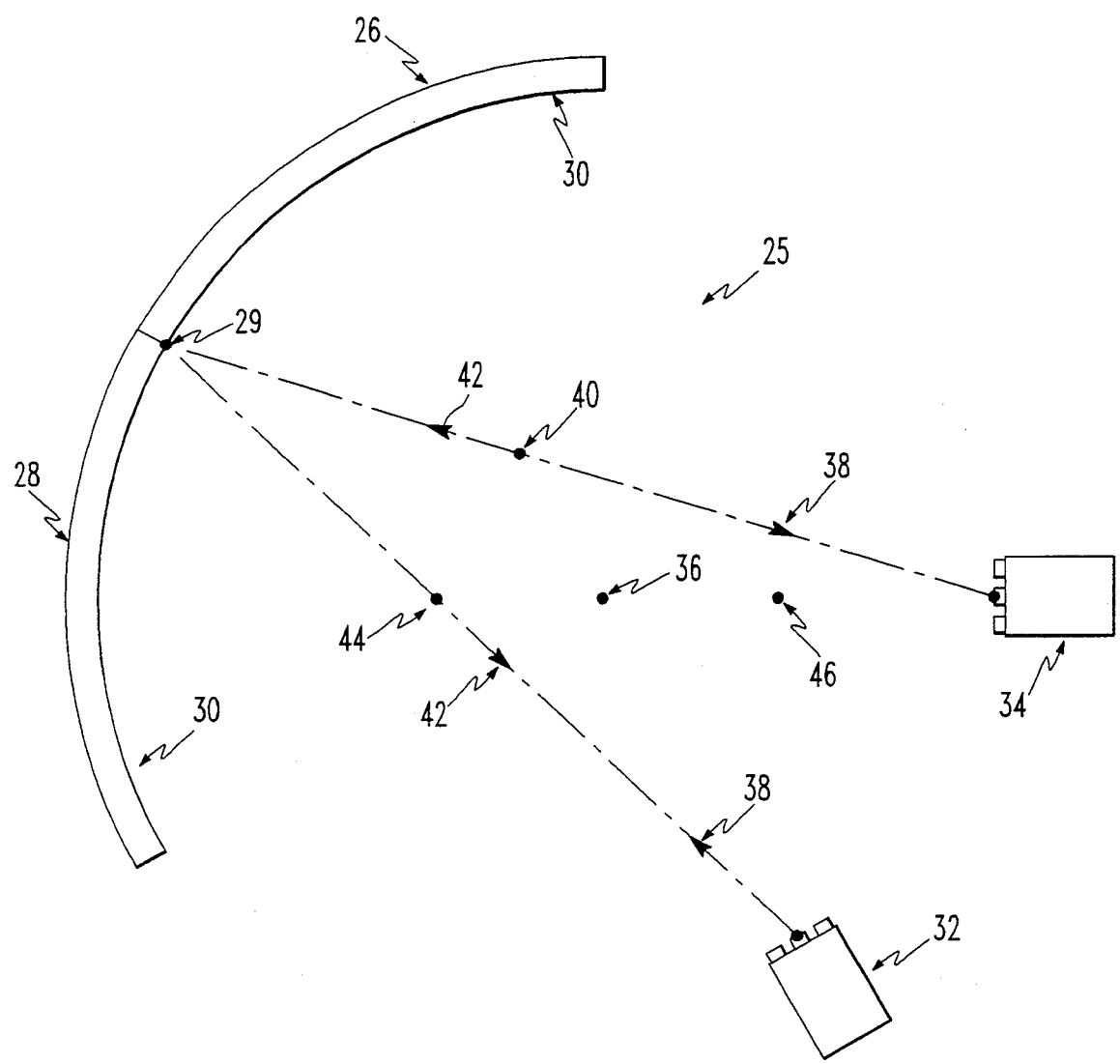
FIG. 2 is a graphical representation showing a plan view of a screen having a toroidal surface.

The following example serves to illustrate the problem of abrupt brightness changes inherent with spherical or toroidal projection screens. Referring to FIG. 2, there is shown a typical spherical or toroidal projection system 25. The toroidal projection system 25 has two screen segments 26, 28 each of which is a portion of a single continuous toroidal surface 30. A toroidal screen as is presently described may be characterized by two parameters, these being the radius of the surface seen in the plan view, commonly called the horizontal radius, and the radius seen in an elevation view, commonly called the vertical radius. The horizontal radius is selected similarly as in the case for the previously described elliptical screen, that is, to achieve a desired viewing distance from center. The size and location of the vertical radius are selected to optimize the image luminance by means known in the art. The segments 26, 28 are adjacent to each other at a boundary 29. Projector 32 projects an image upon the surface 30 of the screen segment 26 while projector 34 projects an image upon the surface 30 of the screen segment 28.

The toroidal screen segments are arranged around a center point 36. Seen in the plan view of FIG. 2, a first light ray 38 projected from projector 32 reflects from the screen segment 26 essentially at boundary 29 and back through the focal point 40 of screen sediment 26. The ray actually reflects through the vertical plane containing focal point 40, and would generally pass above or below focal point 40. Similarly, a second light ray 42 projected from projector 34 reflects from the screen segment 28 essentially at boundary 29 and back through the focal point 44 of the screen segment 28. (Because of the geometry of the toroid, the light rays 38, 42 overlap with each other in FIG. 2). An observer (not shown) when viewing the screen segments 26, 28 from the center point 36 and looking at the boundary 29 would be the same distance from the reflected first light ray 38 as from the reflected second light ray 42. Since the light rays 38, 42 are the same distance from the observer at center point 29, their perceived brightness will be equal and there will be no abrupt change or discontinuities of brightness across the boundary 29.

A different situation occurs when the observer is displaced from the center point 36 of the spherical or toroidal viewing area. If the observer moves to the right in FIG. 2, say to point 46, and looks at the boundary 29, the reflected first light ray 38 from projector 32 is now closer to the observer than the reflected second light ray 42 from projector 34. Thus, the reflected first light ray 38 will appear brighter to the observer than the reflected second light ray 42. This phenomenon occurs along the entire height of the screen segments 26, 28 at the boundary 29 and causes the image projected on the surface of the screen segments 26, 28 to have an abrupt change in brightness at the boundary 29.

Referring back to FIG. 1, there is shown the projection system 10 having two screen segments 12, 13 having ellipsoidal surfaces 14 which are adjacent to each other along boundary 29. The first focal point 16 of the screen segments 12, 13 coincide with each other at point 48. Projector 22 projects an image on screen segment 12 while projector 23 projects an image on screen segment 13. A first light ray 38 projected from projector 22 reflects from the surface 14 of screen segment 12 essentially at the boundary 29 and back through the screen segment's 12 focal point which coincides with point 48. A second light ray 42 projected from projector 23 reflects from the surface 14 of screen segment 13 essentially at boundary 29 and back through the screen segment's 13 focal point which also coincides with point 48. Thus, it can be seen from FIG. 1 that the light rays 38 and 42 essentially follow the same path after reflecting from boundary 29 both intersecting their common focal point, point 48. The importance of this is illustrated as one moves the observer to the right of point 48 to right viewpoint 46. An observer at right viewpoint 46 looking at the boundary 29 is the same distance from reflected light ray 38 as from the reflected light ray 42. Thus, to the observer, the light rays 38 and 42 are the same brightness and there exists no abrupt change in brightness across the boundary 29. In fact, the observer can move anywhere in front of the screen segments 12, 13 and still be the same distance from light ray 38 as from light ray 42 since they essentially overlap after reflection from the boundary 29.

An implementation of the invention to achieve a desired field of view, to wit, extending 240° horizontally and from 10° below the horizon to 30° above the horizon, and with a desired number of projectors, to wit, four, and with a desired distance from the center eyepoint to the screen, to wit, 144", is described in the following paragraphs.

Figure 3:
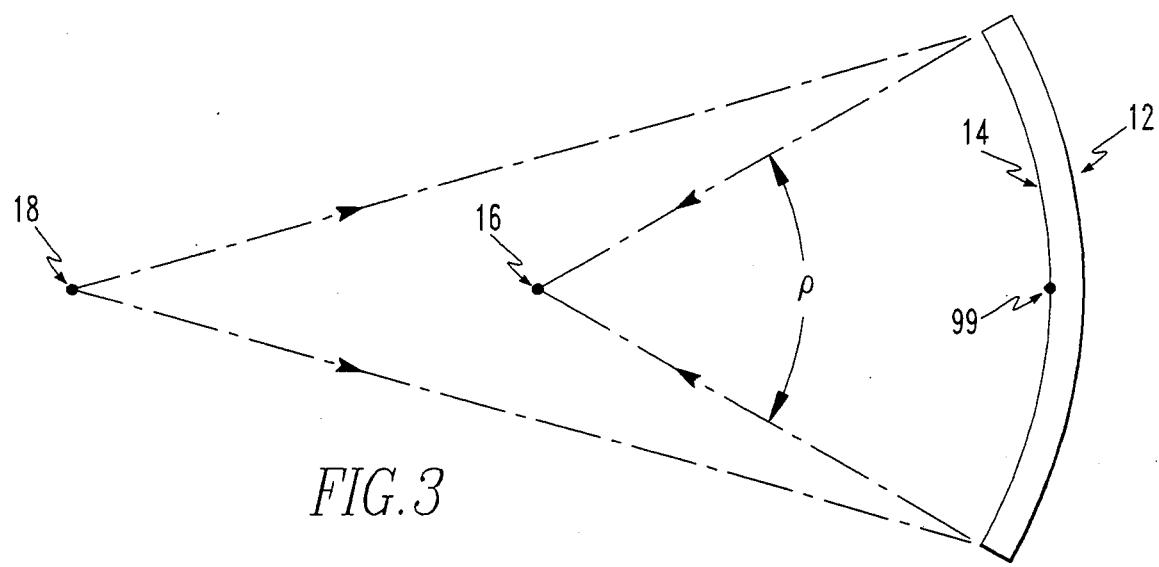
FIG. 3 is a graphical representation showing a plan view of one of the ellipsoidal screen segments and its associated angles.

Referring to FIG. 3, there is shown a plan view of the screen segment 12 having an ellipsoidal-shaped surface 14. The horizontal field of view, defined as $\rho$, is computed as the total horizontal field of view ($\Delta$) divided by the number of projectors, or 240/4=60° as measured from the first focal point 16. Focal point 16 is selected to correspond to the average eye height of the intended observers. A second point 99 is selected, level with focal point 16 and at a distance from focal point 16 chosen from a variety of considerations, including primarily the desired eye relief from the screen and the size of the facility in which the screen is to be installed. A projector (not shown) projects an image upon the surface 14 from the second focal point 18. The location of focal point 18 is selected according to two criteria. First, it is made sufficiently distant from the screen segment by means known in the art so that when the principal point of the projection lens assembly is located at this point, the image from the projector is sufficiently large to cover the entire screen segment. Second, it is located sufficiently high so that the projector does not shadow light rays emanating from another projector onto another screen segment. This latter criterion may be conveniently determined using a scaled elevation drawing of the screen segments, and performing one or more iterations to determine that the mechanical structure of the projector will not cause shadows. The three points thus selected, focal point 16, point 99, and focal point 18, completely define the ellipsoidal surface in the manner previously described. Consequently, the ellipsoid is completely defined by: the center focal point, selected at a convenient eye height; point 99, selected to provide sufficient eye relief (and must be chosen before you can even start to look for point 18); and the second focal point 18 (selected to be sufficiently far from 99 to allow the projector to illuminate the entire screen, and sufficiently high to avoid blocking light from other projectors).

Thus, selection of point 18 is really a simple but iterative process; pick a point, check for screen illumination and shadows, and move it if necessary. Any point 18 that is high enough and distant enough from the screen will work, and will exploit the advantage of the invention (no brightness discontinuities). It is desirable to make point 18 essentially as low as possible and as close to 99 as possible, to obtain the overall brightest, sharpest picture.

Figure 4:
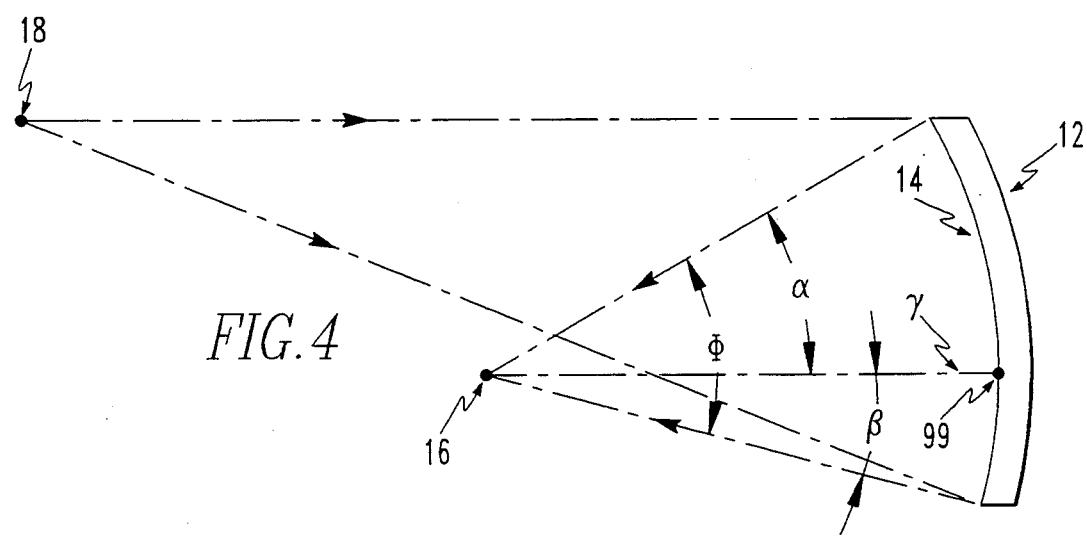
FIG. 4 is a graphical representation showing a side view of one of the screen segments and its associated angles.

Referring to FIG. 4, there is shown a side view of screen segment 12 having an ellipsoidal-shaped surface 14. The projector (not shown) projects an image upon the surface 14 from the second focal point 18. The reflected light rays reflect through the first focal point 16. The vertical field of view, defined as $\phi$, is seen to fulfill the desired vertical field of view extending from 10° below the horizontal ($\beta$) to 30° above the horizontal ($\alpha$) as measured from the first focal point 16. The eye relief defined by line $\gamma$ is 144" when measured horizontally from focal point 16, as was desired.

Figure 5:
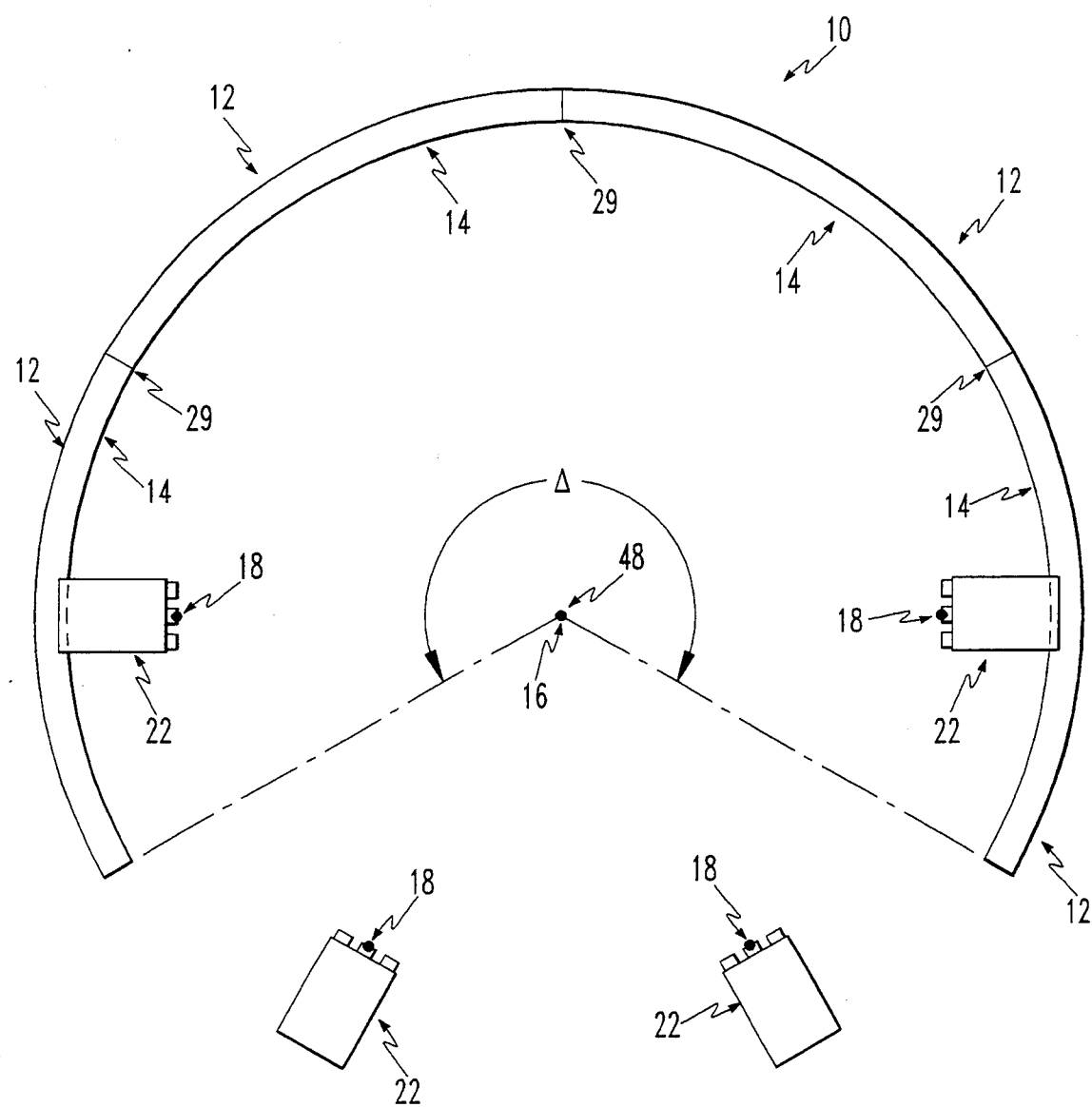
FIG. 5 is a graphical representation showing a plan view of the segmented ellipsoidal projecting system in a typical embodiment.
Figure 6:
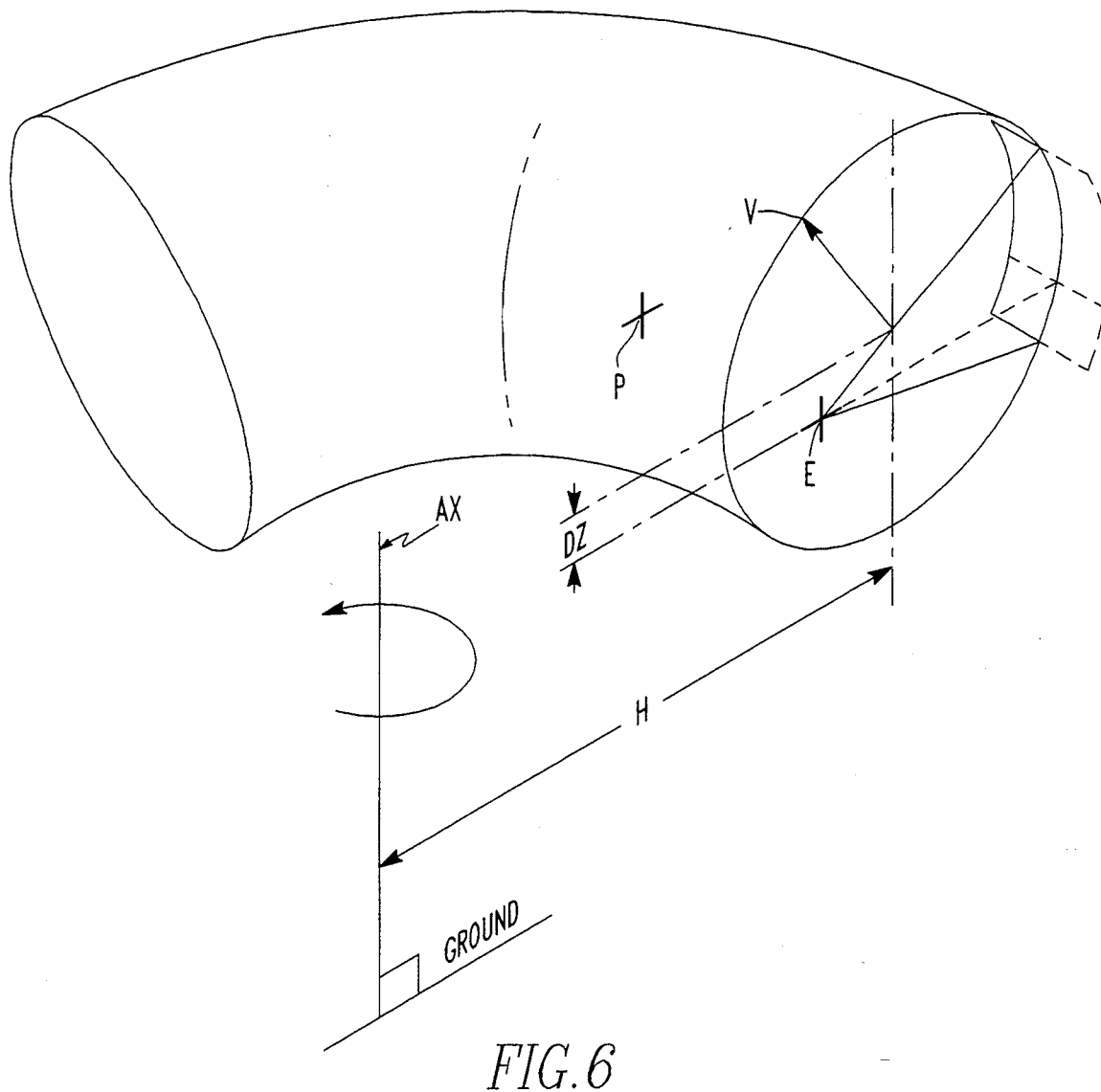
FIG. 6 is a schematic representation showing the geometric parameters of a torus.

In the operation of the projection system 10, it can be used to project life-like images for an air traffic control tower simulator. As shogun in FIG. 5, four screen segments 12 each having an ellipsoidal surface 14 and a horizontal field of view of 60° are arranged such that their first focal point coincides at point 48. Thus, a horizontal field of view of 240°, is provided for the observers. There are four projectors 22 provided, one for each screen segment 12. Each surface 14 is fabricated of high-gain screen material or otherwise provided with a high-gain finish to provide sufficient light reflection back to the observers. The projectors 22 are CRT projectors and each project an image upon their respective screen segments 12. All light rays making up the image are preferentially reflected back through the point 48 to a greater or lesser extent according to the value of screen gain selected. Thus, light rays emitted from two different projectors 22 and reflecting back from one of the boundaries 24 pass through the same point 48 and therefore essentially overlap with each other. Thus, regardless of where the observer is in front of the screen segments 12, there exists no abrupt change in brightness across the boundaries 24.

Due to the complexity of fabricating individual ellipsoidal screen segments, the present invention envisions that the screen segments can be formed in the shape of a toroidal segment having geometric proportions approximating the shape of an ellipsoidal segment. Each projector projects images upon the toroidal screen from the second focal point of the ellipsoidal segment approximated by the toroidal screen. Preferably, the plurality of screen segments are disposed about a center eyepoint E and for points off the center eyepoint E, there are no discontinuities in brightness across boundaries.

Preferably, each screen segment is comprised of a curved panel such as aluminum sheet mounted on a support structure of headers and ribs. By forming a plurality of toroidal screen segments instead of ellipsoidal screen segments, the headers and ribs of all the screen segments can be manufactured having equal radial dimensions, respectively. Thus, all the ribs of all the screen segments can have equal radial dimensions. Likewise, all of the headers of all of the screen segments can have equal radial dimensions.

The present invention is also a method of fabricating a projection screen. The method comprises the step of defining a plurality of ellipsoidal segments each having a first focal point 16 and a second focal point 18. Next, there is the step of forming a plurality of screen segments 14 having a surface in the shape of a toroidal segment having geometric proportions approximating the shape of one of the defined ellipsoidal segments. Then, there is the step of arranging the screen segments 14 in an adjacent relationship such that an edge 20 of the surface of one of the screen segments 14 is essentially adjacent along its entire length to an edge 21 of the surface of another screen segment 14.

Preferably, the arranging step includes the step of arranging the screen segments 14 such that the first focal points 16 of each ellipsoidal segment approximated by the screen segments essentially coincide with each other. Preferably, after the arranging step, there is the step of projecting images onto the surface of each screen segment 14 from the second focal point 18 of the ellipsoidal segment which each screen segment 14 is approximating. Preferably, before the forming step, there is the step of defining a toroidal segment which geometrically approximates each ellipsoidal segment.

The present invention is also a projection system. The projection system comprises means for projecting an image such as a projector 22 and a screen upon which the image is projected. The screen is positioned adjacent the projecting means to receive the image. The screen has a shape such that gain with respect to the image at a center eyepoint, E, is equal to gain with respect to the image at the screen along its surface. Preferably, the screen is comprised of a plurality of screen segments 12, 14 disposed about the center eyepoint, E, such that boundaries 29 are formed between the screen segments 12, 14 and for points off of the center eyepoint, E, there are no discontinuities in brightness of the image across boundaries 29.

A torus is defined mathematically as the surface generated by the rotation of a circle about an axis in the plane of the circle external to the circle. The surface of a doughnut is a common example. For the present invention, that definition is simplified, and torus is taken to mean the surface defined by the rotation of a plane arc, rather than a circle, about a vertical axis in the plane of the arc, without regard to whether the axis would intersect the circle of which the arc is a portion. While certain additional advantages might be realized by allowing the axis of revolution to depart from vertical, some of the advantages in simplified construction and assembly are lost; therefore, in the present invention, the description is limited to the case of a vertical axis of revolution.

The following serves as an index for the geometrical parameters discussed in the following paragraphs and shown in FIGS. 6–10.
AX axis of torus
B, B' bottom side corner of adjacent torus segments
BB belly point
DZ distance of E below center of torus
E center eyepoint
E1 belly ellipse
E2 left vertical ellipse
H horizontal radius of torus
HC center of arc LB-BB-RB
I, I' incident rays from P, P'
LB left point on belly
P, P' upper focus of adjacent ellipsoid segments
R, R' reflected rays
R1 radius of arc LB-BB-RB
RB right point on belly
T, T' top side corner of adjacent torus segments
V vertical radius of torus With reference to FIG. 6, choosing a toroidal segment approximating an ellipsoidal segment consists of choosing the horizontal radius H, the vertical radius V, and a vertical offset DZ. H and V serve to fully define the torus, and DZ chooses the portion of the surface to be used, offering three independent variables. (Where the axis of the torus is allowed to depart from vertical, an additional independent variable would exist.)

Figure 7:
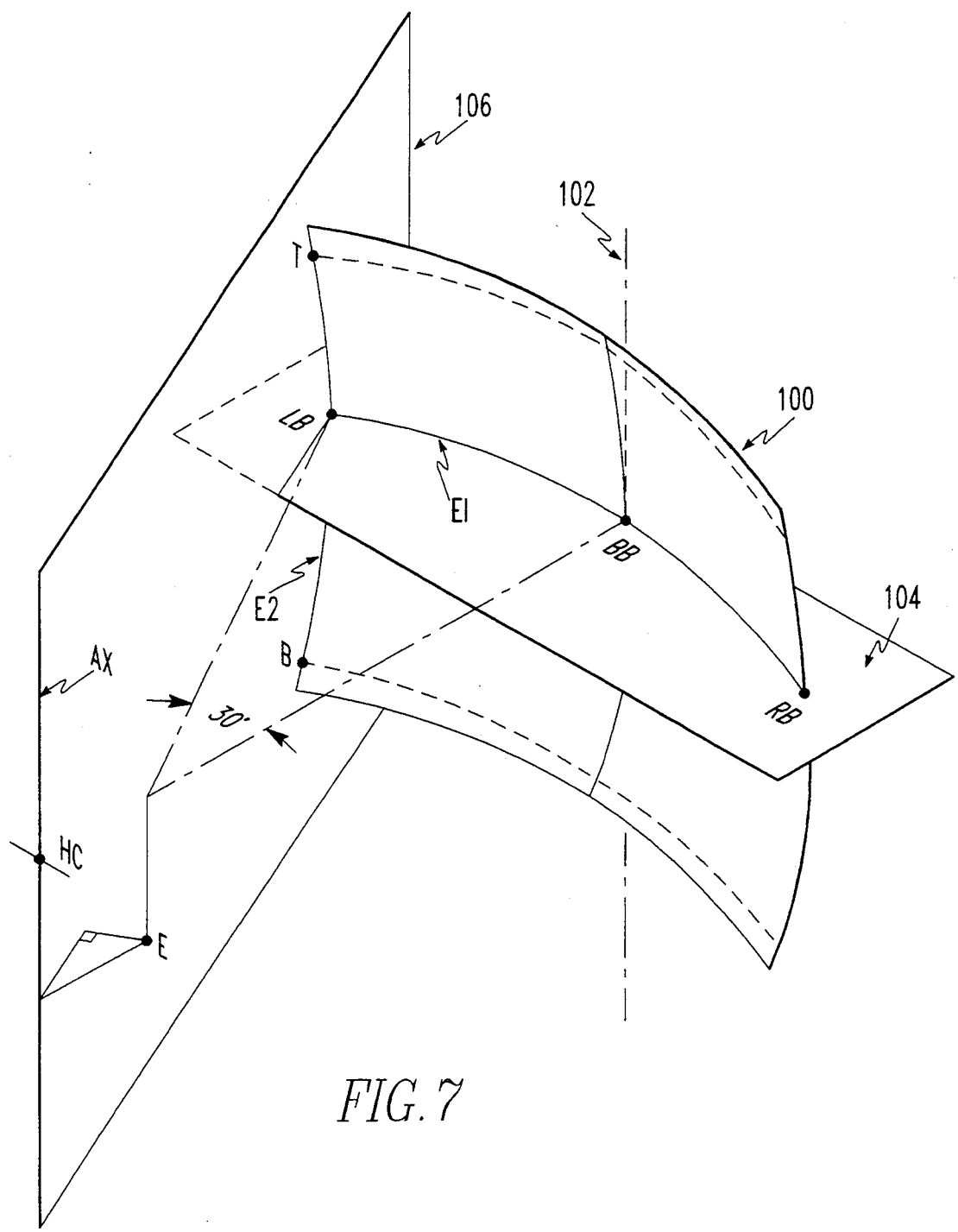
FIG. 7 is a schematic representation showing the geometrical parameters involved in one method of approximating an ellipsoidal surface with a toroidal surface.

With reference to FIG. 7, an ellipsoidal segment 100 is defined by the location of two focuses and a point on the ellipsoidal segment 100, rotated about the axis containing the focuses, and bounded left, right, top, and bottom by four planes of the viewing frustrum. Using an ellipsoidal segment thus defined, the procedure to arrive at a set of parameters for a toroidal segment having similar geometrical characteristics is provided in the following procedure:

1. A first point BB is located as the point of tangency to a vertical line 102 contained in a plane of zero degrees azimuth from the center eyepoint E.

2. A horizontal plane 104 including the point BB is cut through the ellipsoidal segment 100, resulting in a plane curve of intersection, ellipse E1 (it is a mathematical property of ellipsoids that all plane cuts create ellipses).

3. A second point LB and third point RB are located as the points on ellipse E1 at the left and right edges of the ellipsoidal segment 100; in one embodiment, the second and third points LB, RB are at 30 degrees left and right azimuth from the center eyepoint E.

4. The points LB, BB, and RB, as any three points in space which are not co-linear, define a first circular arc. By common mathematical means, or through the use of a computer-assisted drafting program, the center HC of the first circular arc may be located. The radius R1 of this arc, found as the distance from any point on the arc to the center HC, is the sum of the horizontal and vertical radii H, V of the toroidal segment. A vertical line through HC becomes the axis AX of the torus segment, about which a certain circular arc contained in a vertical plane, shortly to be described, will be rotated.

5. A vertical plane 106 containing axis AX and second point LB is cut through the ellipsoidal segment 100, resulting in a second ellipse, E2, as the plane curve of intersection. In addition to the point LB, fourth and fifth points T and B are located on ellipse E2, as the intersections of the top and bottom planes of the viewing frustrum with ellipse E2.

6. The second, fourth and fifth points LB, T and B, being three points not co-linear, define a second circular arc. The center 108 of this second arc, as shown in FIG. 8b, is located by either of the means previously described. The radius of this second arc is the vertical radius V of the torus.

A toroidal segment is thus defined as having a vertical radius V, found in Step 6 above, and a horizontal radius H, computed as the radius R1 found in Step 4 minus the vertical radius V. Under some circumstances, radius H may be found to be negative. The interpretation of this is simply as shown in FIG. 8b, wherein the center 108 of the second arc, the arc segment to be revolved, is on the opposite side of axis of revolution AX from the second arc segment.

The toroidal surface thus defined is the surface formed by the rotation of the second arc T-LB-B about the axis AX. This continuous toroidal surface is then cut left and right by two vertical planes, each containing the center eyepoint E, and angularly separated so as to provide the desired azimuth extent of the segment.

It should be appreciated that there are other means by which the geometrical parameters of the toroidal surface may be derived other than by the geometrical construction described above. In particular, those skilled in the art may use mathematical analysis to create and minimize the value of an error function, such error function representing a measure of the extent to which the performance of the toroidal segment deviates from the ellipsoid segment.

Figure 9:
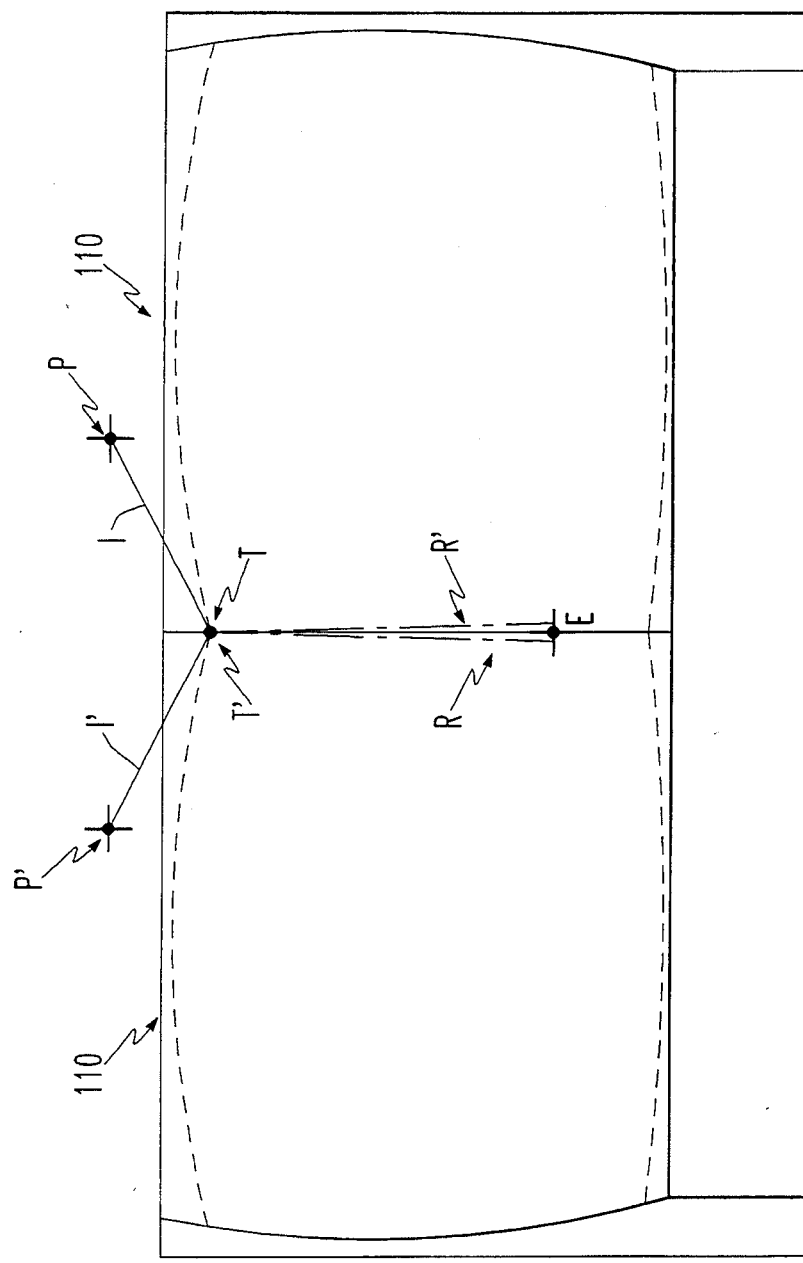
FIG. 9 is a schematic representation showing a front view of two adjacent toroidal screen segment with associated projection and reflection rays from the top of the interface.
Figure 10:
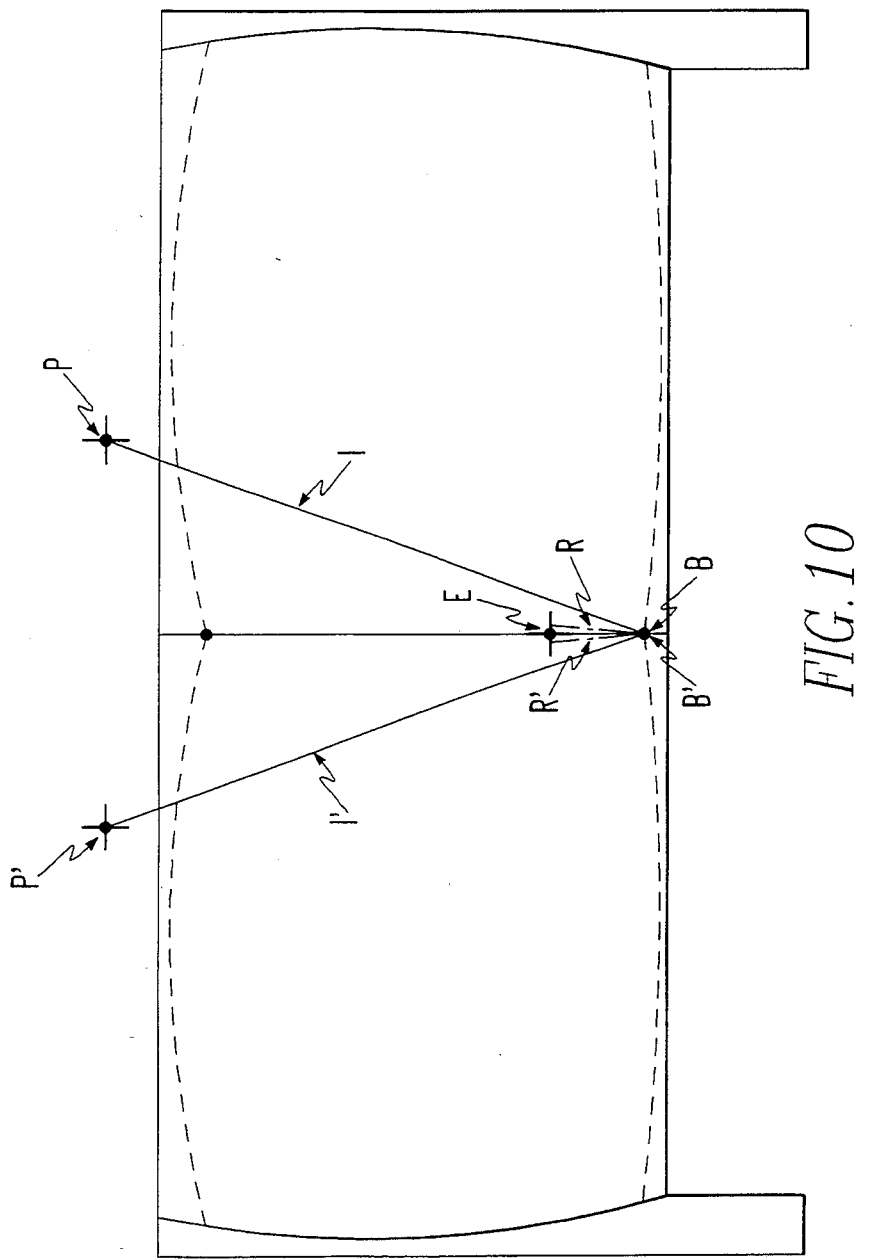
FIG. 10 is a schematic representation showing a front view of two adjacent toroidal screen segment with associated projection and reflection rays from the bottom of the interface.

With reference to FIGS. 9 and 10, the performance of a segmented torus screen thus defined, whether by geometric construction or mathematical analysis, is analyzed by investigating the return path of rays of light originating at the upper focuses P, P' of adjacent ellipsoidal segments that the torus segments seek to emulate, reflected in specular fashion from adjacent points along the shared edge of the adjacent torus segments. Each reflected ray returns nearby the center eyepoint E, the first focal point common to all the ellipsoidal segments approximated by the toroidal screens 110. (By the nature of the juxtaposition of the segments about E, the reflected rays will always exhibit left-right symmetry about the plane that separates the two segments.) There are two marks of merit, which can be related to the advantages of the segmented ellipsoidal screen:

i) to the extent that the rays return close by the center eyepoint E, the screen, when observed from E, will exhibit gain approaching the surface gain; and ii) to the extent that the reflected rays are themselves close together (i.e., close horizontal separation, regardless of the common vertical displacement they share from E), then for an observer at some other location in the viewing volume, the distance from the observer will be approximately the same to each of the return rays, and the observed brightness of the adjacent points approximately the same.

Thus, the segmented torus screen will share the advantages of the segmented ellipsoidal screen: high overall screen gain from the center eyepoint E, and small brightness discontinuities across the channel boundaries.

Figure 8A:
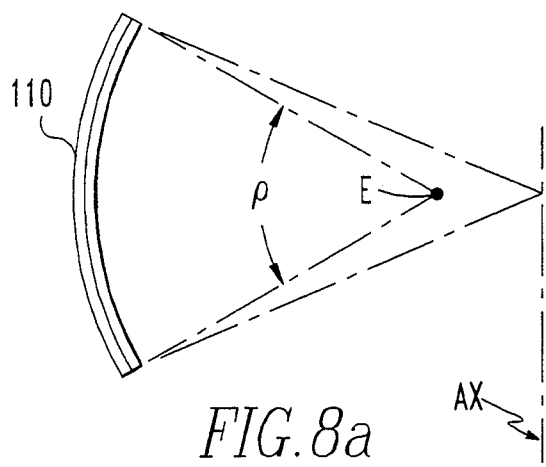
FIGS. 8a and 8b are a plan view and an elevation view, respectively, of a toroidal screen segment.
Figure 8B:
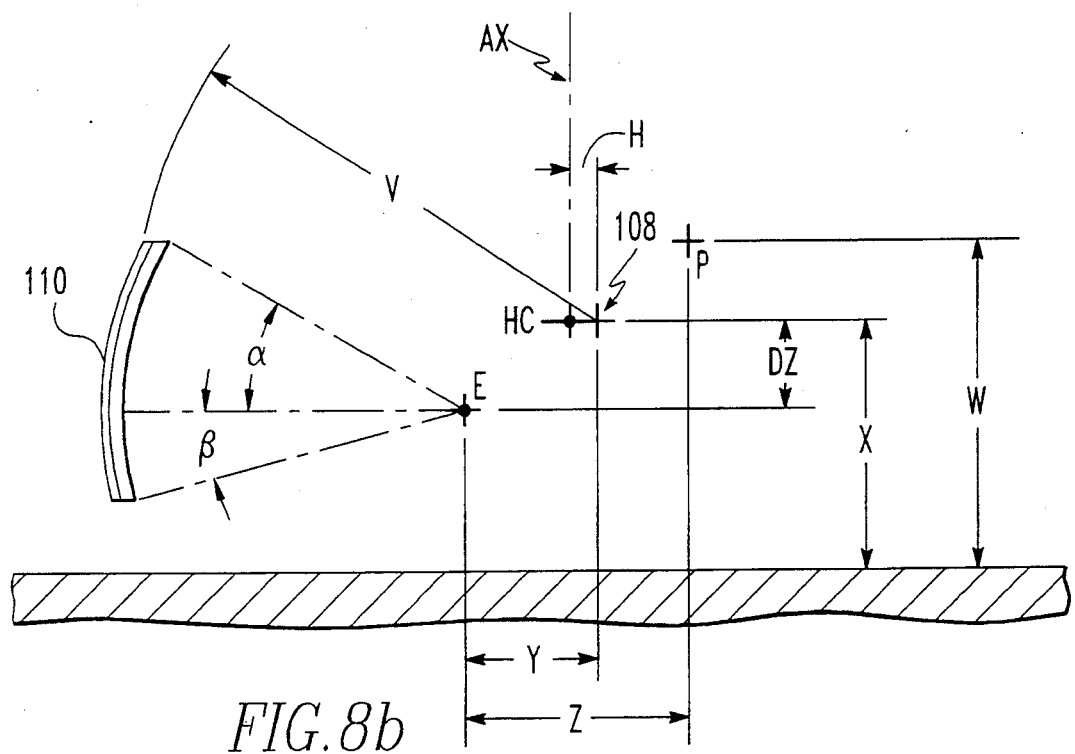

Using the geometric procedure described above, an ellipsoidal segmented screen is approximated by a segmented torus screen constructed of a plurality of segments of the design shown in FIG. 8, and having the following parameters:

H = −10.55
V = 191.36
DZ = −38.60
W = 160.00
X = 102.60
Y = 43.64
Z = 84"

The performance of this design is evaluated by the criteria described above, with reference to FIG. 9 which shows an elevation view of the two adjacent toroidal screen segments 110. Analysis of the reflected rays, using a computer-assisted drafting program and geometric construction, shows the following:

i) rays I and I' from upper focuses P and P' to the adjacent points T and T' respectively, create reflected rays R and R'. The acute angle between the ideal reflected ray T-E (or the coincident ray T'-E) and either of the rays R, R' is 0.68 degrees.

ii) the acute angle between rays R and R' is 1.25 degrees.

A similar analysis for the bottom corners of adjacent toroidal screen segments 110, shown in FIG. 10, shows the following:

i) rays I and I' from upper focuses P and P' to the adjacent points B and B' respectively, create reflected rays R and R'. The acute angle between the ideal reflected ray B-E (or the coincident ray B'-E) and either of the rays R, R' is 0.76 degrees.

ii) the acute angle between rays R and R' is 1.24 degrees.

Evaluation of performance at intermediate points along the shared edge by similar means shows that the performance at top and bottom is worst case, and intermediate points generate reflected rays which are both closer to the center eyepoint E and closer to one another.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A projection system comprising:
   a plurality of screen segments, each defining a surface in the shape of a toroidal segment having geometric proportions approximating the shape of a predetermined ellipsoidal segment having a first focal point and a second focal point, said screen segments arranged such that an edge of the surface of one of the screen segments is essentially adjacent along its entire length to an edge of the surface of another screen segment defining a boundary; and
   a plurality of projectors equal to the number of screen segments wherein each of said projectors projects an image upon one of the screen segments from the second focal point of the ellipsoidal segment approximated by the screen segment.

2. A projection system as described in claim 1 wherein the plurality of screen segments are disposed about a center eyepoint and for points off of the center eyepoint, there are no discontinuities in brightness across boundaries.

3. A projection screen as described in claim 2 wherein the screen segments are arranged such that the first focal point of each ellipsoidal segment approximated by the surface of the screen segments essentially coincide with each other.

4. A projection system as described in claim 3 wherein the surface of each screen segment is a high-gain surface.

5. A projection system as described in claim 4 wherein each projector is a CRT projector.

6. A projection system as described in claim 5 wherein each surface provides a horizontal field of view of 60° as measured from the first focal point.

7. A projection system as described in claim 6 wherein each surface provides a vertical field of view of 40° as measured from the first focal point.

8. A projection system as described in claim 7 wherein each surface segment provides an eye relief of 144" as measured from the focal point.

9. A projection system as described in claim 8 wherein there are four screen segments.

10. A projection system as described in claim 8 wherein there are six screen segments.

11. A projection system as described in claim 10 wherein each screen segment is comprised of a curved panel mounted on a support structure of headers and ribs.

12. A projection system as described in claim 11 wherein the headers and ribs of all of the screen segments have equal radial dimensions, respectively.

13. A method of fabricating a projection screen comprising the steps of:
- defining a plurality of ellipsoidal segments each having a first focal point and a second focal point;
- forming a plurality of screen segment having a surface in the shape of a toroidal segment having geometric proportions approximating the shape of one of the defined ellipsoidal segments; and
- arranging the screen segments in an adjacent relationship such that an edge of the surface of one of the screen segments is essentially adjacent along its entire length to an edge of the surface of another screen segment.

14. A method as described in claim 13 wherein the arranging step includes the step of arranging the screen segment such that the first focal points of each ellipsoidal segment approximated by the screen segments essentially coincide with each other.

15. A method as described in claim 14 wherein after the arranging step, there is the step of projecting images onto the surface of each screen segment from the second focal point of the ellipsoidal segment which each screen segment is approximating.

16. A method as described in claim 15 wherein before the forming step, there is the step of defining a toroidal segment which geometrically approximates each ellipsoidal segment.

17. A method as described in claim 16 wherein the step of defining a toroidal segment includes the steps of defining a first point on the ellipsoidal segment as the point of tangency between the ellipsoidal segment and a vertical line in a plane of zero degrees azimuth from a center eyepoint of the ellipsoidal segment; defining a horizontal plane through the first point such that a first arc of an ellipse is defined which spans the ellipsoidal segment; defining second and third points at each end of the arc of the ellipse, respectively; defining a first circular arc through the first point, second point and third point having a first radius and a first center; defining a vertical axis through the first center; defining a plane through the vertical axis and the second point on the ellipsoidal segment such that a second arc of an ellipse is defined; defining a fourth and fifth point on the second arc; and defining a second circular arc through the second point, the fourth point and the fifth point having a second radius and a second center point, said toroidal segment defined by rotation of the second arc about the vertical axis wherein the second center is at a distance equal to the first radius minus the second radius from the vertical axis.

18. A projection system comprising:
- means or mechanism for projecting an image; and
- a screen upon which the image is projected, said screen positioned adjacent the projecting means to receive said image, said screen having a shape such that gain with respect to the image at a center eyepoint is equal to gain with respect to the image at the screen along its surface said screen coated with a constant high-gain finish.

19. A projection system as described in claim 18 comprised of a plurality of screen segments disposed about the center eyepoint such that boundaries are formed between the screen segments and for points off of the center eyepoint there are no discontinuities in brightness of the image across boundaries.

20. A projection system as described in claim 19 wherein the projecting means or mechanism includes a plurality of projectors which project the image onto the screen segments.

21. A projection system as described in claim 20 wherein each screen segment is comprised of a curved panel mounted on a support structure of headers and ribs.

22. A projection system as described in claim 21 wherein the headers and ribs of all of the screen segments have equal radial dimensions, respectively.

* * * * *